H. JUNKERS.
APPARATUS FOR HEATING LIQUIDS.
APPLICATION FILED DEC. 30, 1913.

1,133,564.

Patented Mar. 30, 1915.

Witnesses:
C. B. Schroeder
M. D. Bunn.

Inventor:
Hugo Junkers
By Pennie Davis & Goldsborough
Attys.

UNITED STATES PATENT OFFICE.

HUGO JUNKERS, OF AACHEN, GERMANY.

APPARATUS FOR HEATING LIQUIDS.

1,133,564.  Specification of Letters Patent.  Patented Mar. 30, 1915.

Application filed December 30, 1913. Serial No. 809,467.

*To all whom it may concern:*

Be it known that I, HUGO JUNKERS, a subject of the King of Prussia, residing at Aachen, No. 68 Bismarckstrasse, in the Kingdom of Prussia, Empire of Germany, have invented certain new and useful Improvements in Apparatus for Heating Liquids; and I do hereby declare the following to be a full, clear, and exact description of the invention, such as will enable others skilled in the art to which it appertains to make and use the same.

This invention relates to improvements in apparatus for heating liquids of the character disclosed in the United States Letters Patent No. 797,960 of August 22nd, 1905, and is characterized by the fact that the double mantle or jacket serving to conduct the liquid, is replaced by channels or tubes which are located in heat-conducting connection with the mantle of the heating chamber and the lamel heating body. The use of the channels or tubes affords the advantage that on account of the great strength of the tubes the liquid-heating apparatus can be employed for a higher inner pressure without necessitating the provision of a great thickness of the mantle-wall. This results in a saving of material and the safety of operation is increased at the same time.

According to my present invention liquid-conducting channels are arranged on both sides of the mantle of the heating chamber as well as on those of the lamel heating body. Thereby a more efficient transmission of heat by the mantle and the lamel heating body is obtained. The liquid-heating apparatus may therefore be built in smaller dimensions with the same efficiency, whereby a further saving of material is obtained.

Figure 1:
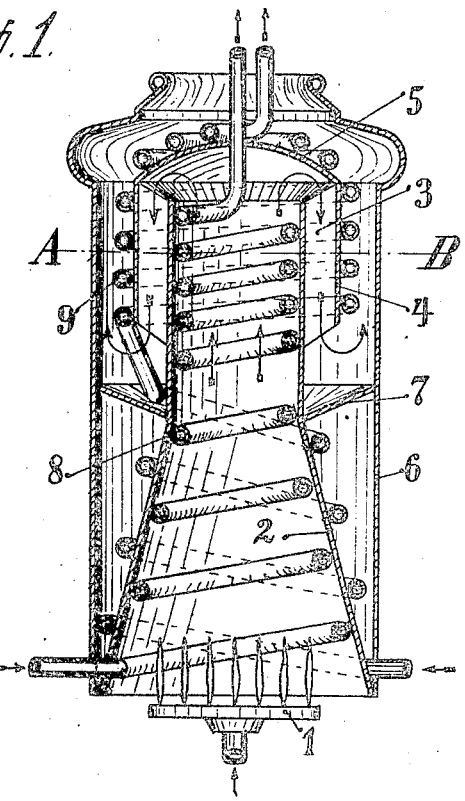
Figure 2:
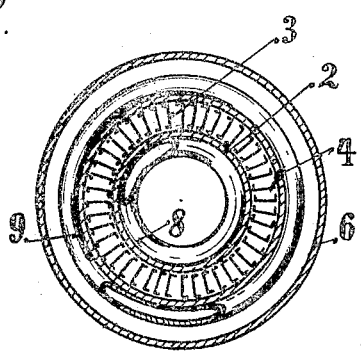

In the accompanying drawings: Figure 1 is a vertical section of the liquid-heating apparatus and Fig. 2 is a section on line A—B of Fig. 1.

The combustion chamber which is arranged above the burner 1, is formed by a mantle 2 being preferably cone-shaped in its lower part but cylindrical in its upper part. A lamel heating body is arranged on this upper cylindrical part and consists of radial plates 3 which stand in heat-conducting connection with the mantle 2 and support at their outer edges another mantle or hood 4 which serves as an inclosure 5 for the lamel heating body. This device is inclosed in an ornamental mantle or casing 6 and below the lamel heating body the space between the ornamental mantle 6 and mantle 2 of the heating chamber is closed by a partition 7. On account of this arrangement, the heating gases rising from the burner are forced to take the course indicated by arrows.

A tube-spiral 8 is arranged in casing or mantle 2 of the heating chamber and stands in heat-conducting connection with said mantle and receives and contains the liquid to be heated. The liquid enters the apparatus at the bottom and is conveyed to the outlet at the top. The windings of the tube-spiral are closer together in the upper part of the heating chamber in proximity to the lamel heating body. A second tube-spiral 9 is arranged on the outside of mantle 2 and of the outer mantle of the lamel heating body as well as on the covering cap of the latter. The inlet and outlet of the liquid takes place in the same manner as in the first spiral, and the windings of the latter are likewise closer together at the region of the lamel heating body.

I claim:—

A liquid heating apparatus comprising the combination of a vertically disposed mantle structure open at its ends, a heater at the lower end of the mantle, a hood mounted over the upper end of the mantle, a plurality of radially disposed plates located between the inner side of the hood and the adjacent portion of the mantle, a coil of piping mounted upon the inner side of the mantle extending from the lower to the upper end thereof and arranged in heat-transferring connection with the mantle, a second coil of piping mounted upon the outer side of the mantle below the hood and upon the outer side and top of the hood and arranged in heat-transferring connection with the mantle and hood, and a casing inclosing the mantle, hood and piping; substantially as described.

In testimony whereof I have signed my name to this specification in the presence of two subscribing witnesses.

HUGO JUNKERS.

Witnesses:
 MAX KLOSS,
 HEINRICH ZIMMERMANN.